United States Patent
Ling et al.

(10) Patent No.: US 9,466,991 B2
(45) Date of Patent: Oct. 11, 2016

(54) MATRIX CHARGER APPARATUS AND CHARGING METHOD

(71) Applicant: Industrial Technology Research Institute, Hsinchu (TW)

(72) Inventors: Shou-Hung Ling, Taipei (TW); Shih-Hao Liang, New Taipei (TW); Ying-Hao Hsu, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 444 days.

(21) Appl. No.: 14/049,236

(22) Filed: Oct. 9, 2013

(65) Prior Publication Data

US 2014/0320067 A1 Oct. 30, 2014

Related U.S. Application Data

(60) Provisional application No. 61/815,732, filed on Apr. 25, 2013.

(30) Foreign Application Priority Data

Jul. 16, 2013 (TW) .............................. 102125447 A

(51) Int. Cl.
*H02J 7/00* (2006.01)
*H02J 1/10* (2006.01)
(Continued)

(52) U.S. Cl.
CPC .......... *H02J 7/0018* (2013.01); *B60L 11/1812* (2013.01); *H02J 7/1423* (2013.01); *Y02T 10/7005* (2013.01); *Y02T 10/7072* (2013.01); *Y02T 90/127* (2013.01); *Y02T 90/14* (2013.01)

(58) Field of Classification Search
CPC ..... Y02E 60/12; H02J 7/0042; H02J 7/0045; H02J 7/0055; H02J 7/022; H02J 7/0031; H02J 1/10; H02J 1/102; H02J 7/34; H02J 7/35; H02J 7/0024; H02J 3/32; H02J 3/382; H02J 7/0063; H02J 7/1423; H02J 15/00; H01M 10/44; H01M 10/46; Y02T 10/7005; Y02T 90/121; G06F 1/26; A61N 1/36032; A61N 1/378; H04R 25/606; B65G 47/261; F02N 11/0866; G05F 1/62
USPC .................. 320/107, 138; 307/43, 46, 48–50
See application file for complete search history.

(56) References Cited

U.S. PATENT DOCUMENTS 5,617,004 A 4/1997 Kaneko
5,821,733 A 10/1998 Turnbull
(Continued)

FOREIGN PATENT DOCUMENTS

CN 102522602 6/2012
CN 103066665 4/2013
(Continued)

OTHER PUBLICATIONS

Search Report of European Counterpart Application, issued on Mar. 22, 2016, p. 1-p. 10.
(Continued)

*Primary Examiner* — Richard Isla Rodas
*Assistant Examiner* — Mohammed J Sharief
(74) *Attorney, Agent, or Firm* — Muncy, Geissler, Olds & Lowe, P.C.

(57) ABSTRACT

A charger apparatus and a charging method are provided for charging/discharging battery modules connected in series. The chargers of the charger apparatus are grouped at least into a first charger group and a second charger group. The first terminal of the first charger of the first charger group is coupled to the positive terminal of the i-th battery module of the battery modules, and the second terminal of the first charger is coupled to a first node between the j-th battery module and the k-th battery module of the battery modules, wherein j ranges between i and k. The first terminal of the second charger of the second charger group is coupled to a second node between the i-th battery module and the j-th battery module, and the second terminal of the second charger is coupled to the negative terminal of the k-th battery module.

24 Claims, 7 Drawing Sheets

(51) Int. Cl.
*H02J 1/12* (2006.01)
*H02J 3/32* (2006.01)
*H02J 7/14* (2006.01)
*B60L 11/18* (2006.01)

(56) References Cited

U.S. PATENT DOCUMENTS

| | | | |
|---|---|---|---|
| 6,377,024 B1 | 4/2002 | Choy | |
| 6,771,045 B1 | 8/2004 | Keller | |
| 7,218,076 B2 | 5/2007 | Cheiky et al. | |
| 7,583,056 B2 | 9/2009 | Chiang et al. | |
| 8,723,480 B2 * | 5/2014 | Lim | H02J 7/0019 320/116 |
| 2003/0146737 A1 | 8/2003 | Kadouchi et al. | |
| 2005/0269988 A1 | 12/2005 | Thrap | |
| 2011/0089898 A1 * | 4/2011 | Lee | H02J 7/0016 320/116 |
| 2011/0241623 A1 | 10/2011 | Wade et al. | |
| 2011/0254502 A1 | 10/2011 | Yount et al. | |
| 2012/0217806 A1 | 8/2012 | Heidenreich et al. | |
| 2013/0043842 A1 | 2/2013 | Mercier et al. | |

FOREIGN PATENT DOCUMENTS

| | | |
|---|---|---|
| CN | 202872396 | 4/2013 |
| EP | 2541731 | 1/2013 |
| JP | 2009261134 | 11/2009 |
| JP | 2010004679 | 1/2010 |
| TW | 201108544 | 3/2011 |
| TW | 201117518 | 5/2011 |
| TW | M421608 | 2/2012 |

OTHER PUBLICATIONS

Office Action of China Counterpart Application, issued on Nov. 11, 2015, p. 1-p. 9, in which the listed references were cited.

Office Action of Taiwan Counterpart Application, issued on Mar. 6, 2015, p. 1-p. 7, in which the listed references were cited.

Lee et al., "Intelligent Control Battery Equalization for Series Connected Lithium-Ion Battery Strings," IEEE Transactions on Industrial Electronics, Oct. 2005, pp. 1297-1307, vol. 52, No. 5.

Zhao et al, "Reconfigurable Solar Photovoltaic Battery Charger Using a Switch Matrix," Telecommunications Energy Conference (INTELEC), 2012, p. 1.1.

Teofilo et al., "Advanced Lithium Ion Battery Charger," IEEE AES Systems Magazine, Nov. 1997, pp. 30-35.

Kutkut et al., "Charge Equalization for Series Connected Battery Strings," IEEE Transactions on Industry Applications, May/Jun. 1995, pp. 562-568, vol. 31, No. 3.

Kutkut and Divan, "Dynamic Equalization Techniques for Series Battery Stacks," Telecommunications Energy Conference, 1996, pp. 514-521.

Hung et al., "Extension of Battery Life via Charge Equalization Control," IEEE Transactions on Industrial Electronics, Feb. 1993, pp. 96-104, vol. 40, No. 1.

\* cited by examiner

MATRIX CHARGER APPARATUS AND CHARGING METHOD

CROSS-REFERENCE TO RELATED APPLICATIONS

This non-provisional application claims the priority benefit of U.S. provisional application Ser. No. 61/815,732, filed on Apr. 25, 2013. This application also claims the priority benefit of Taiwan application serial no. 102125447, filed on Jul. 16, 2013. The entirety contents of each of the above-mentioned applications are hereby incorporated by reference and made a part of this specification.

TECHNICAL FIELD

The technical field relates to a matrix charger apparatus and a charging method.

BACKGROUND

There are lots of electrical apparatuses supplied by batteries, such as handheld electronic devices, cell-driven vehicles, or other apparatuses with built-in batteries; in general, the batteries can serially connect battery modules to form at least one battery module series for supplying the voltage level required by the above-mentioned electrical apparatus. After the above-mentioned electrical apparatus consumes electricity supplied by the battery module series, the conventional charger apparatus charges the battery module series by using one charger; however, the difference in characteristics of different battery modules of the battery module series often causes charging and discharging difference between these battery modules, such as undercharge or overcharge.

Therefore, the charger apparatus not only charges the battery module series but also equalizes the batteries. The conventional charger apparatus includes not only the charger but also a corresponding monitor/equalization circuit (adjustment logic) installed in each battery module of the battery module series to monitor/equalize the charging condition of every battery module and to control matching or equalization of the battery module series. The additional monitor/equalization circuit often increases the cost of the conventional charger apparatus; moreover, the cost of the charger is rather high due to the high charge voltage supply of the charger for charging the battery module series.

SUMMARY

Accordingly, the disclosure is directed to a charger apparatus and a charging method by using a plurality of chargers to simultaneously charge/discharge and equalize battery modules that are connected in series.

An embodiment of the disclosure provides a charger apparatus that is applied to charge/discharge the battery module series. The battery module series comprises a plurality of battery modules connected in series. The charger apparatus comprises a plurality of chargers which are grouped at least into the first charger group and the second charger group, and these chargers comprise at least the first charger and the second charger. The first charger is grouped into the above-mentioned first charger group. The charging current output terminal of the first charger is coupled to the positive terminal of the i-th battery module of the battery modules, while the charging current input terminal of the first charger is coupled to a first node which is between the j-th battery module and the k-th battery module of the battery modules, wherein i, j, and k are integers, and j is between i and k. The second charger is grouped into the second charger group mentioned above. The charging current output terminal of the second charger is coupled to the second node which is between the i-th battery module and the j-th battery module, and the charging current input terminal of the second charger is coupled to the negative terminal of the k-th battery module.

An embodiment of the disclosure provides a charging method. The charging method includes following steps. A plurality of chargers are grouped at least into the first charger group and the second charger group, wherein the first charger group comprises at least the first charger, while the second charger group comprises at least the second charger. The first charger group and the second charger group are coupled to the battery module series to charge/discharge the battery module series. The battery module series comprises a plurality of battery modules connected in series. The charging current output terminal of the first charger is coupled to the positive terminal of the i-th battery module of the battery modules. The charging current input terminal of the first charger is coupled to the first node which is between the j-th battery module and the k-th battery module of those battery modules, wherein i, j, and k are integers, and j is between i and k. The charging current output terminal of the second charger is coupled to the second node which is between the i-th battery module and the j-th battery module mentioned above, and the charging current input terminal of the second charger is coupled to the negative terminal of the k-th battery module.

An embodiment of the disclosure provides a charging method. The charging method includes following steps. Each charger of a plurality of chargers connected to the battery module series separately selects a corresponding connection pattern from a plurality of connection patterns, wherein each battery module of a plurality of battery modules of the battery module series is charged/discharged by at least one of those chargers. The chargers are grouped at least into the first charger group and the second charger group, and the first charging combination of the first charger group is different from the second charging combination of the second charger group. The first charging combination indicates each battery module of those battery modules is charged by several chargers of the first charger group, while the second charging combination indicates each battery module of those battery modules is charged by several chargers of the second charger group.

As described above, in the embodiments of the disclosure, the charger apparatus and the charging method can provide a charging structure that charges/discharges serially-connected battery modules by means of the chargers and simultaneously completes the battery equalization. Therefore, the charger apparatus and the charging method described in the embodiments of the disclosure do not need any additional monitor/equalization circuit.

Several exemplary embodiments accompanied with figures are described in detail below to further describe the disclosure in details.

BRIEF DESCRIPTION OF THE DRAWINGS

The disclosure will become more fully understood from the detailed description given herein below for illustration only and thus does not limit the disclosure, wherein.

DETAILED DESCRIPTION OF DISCLOSED EMBODIMENTS

Figure 1:
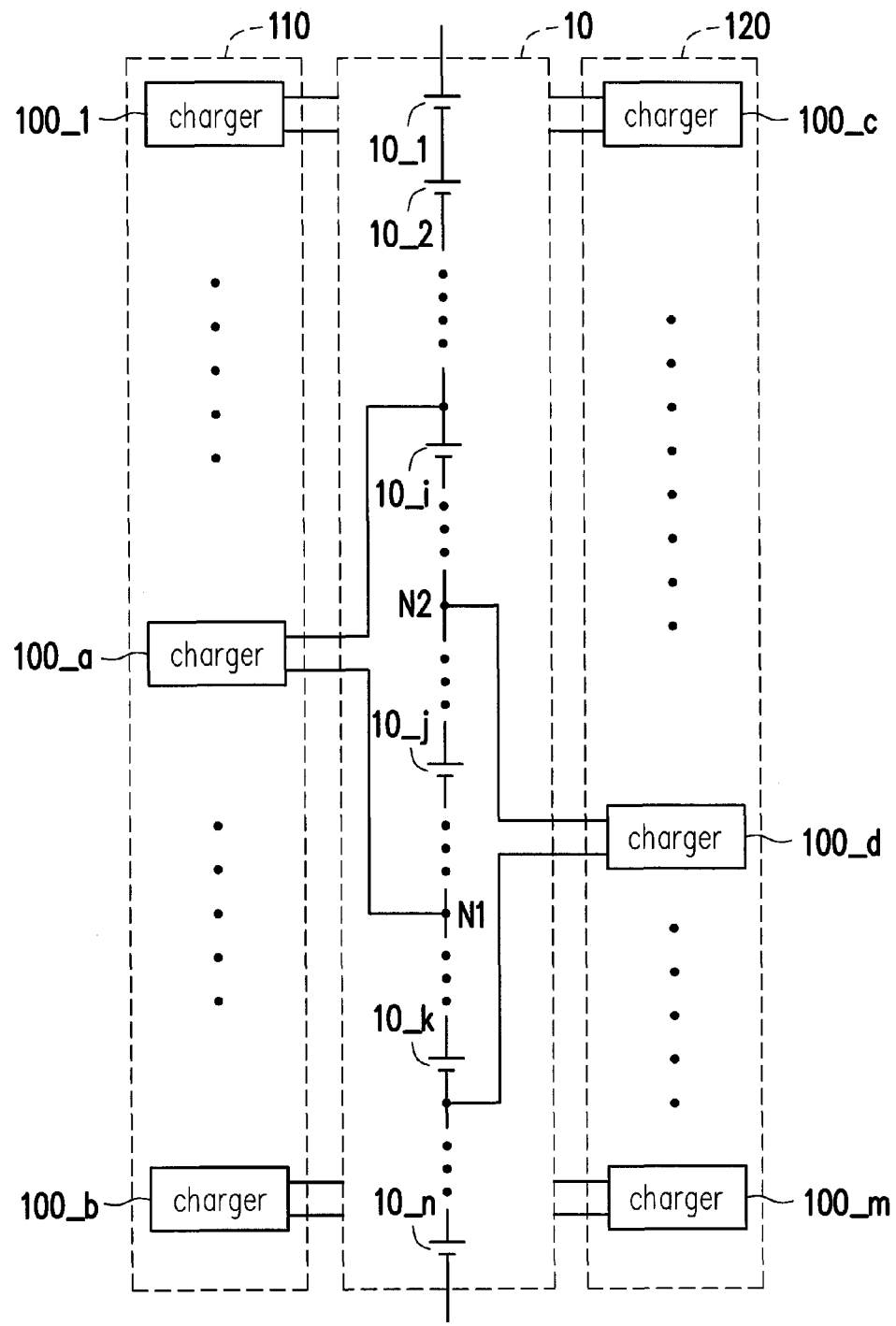
FIG. 1 is a schematic block diagram of a circuit of a charger apparatus according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

"Coupling" used in the full disclosure (including the claims) can refer to any direct or indirect connection means. For example, in the disclosure, if the first apparatus is coupled to the second apparatus, it should be interpreted that the first apparatus can be directly connected to the second apparatus, or the first apparatus can be indirectly connected to the second apparatus through another apparatus or a certain connection means. In addition, where possible, the components/the elements/the steps in the drawings and the embodiments herein share the same or similar reference numerals. In different embodiments, the components/the elements/the steps having the same reference numerals or using the same wording may cross-reference to related descriptions.

FIG. 1 is a schematic block diagram of a circuit of a charger apparatus according to an embodiment of the disclosure. The charger apparatus shown in FIG. 1 can charge and discharge the battery module series 10. The battery module series 10 includes n battery modules 10_1, 10_2, ..., 10_i, ..., 10_j, ..., 10_k, ..., and 10_n connected in series, as shown in FIG. 1. Here, i, j, k, and n are integers, i, j, and k are smaller than n, and j ranges between i and k. The battery modules 10_1 to 10_n can be a single battery cell (i.e., a battery cell monomer) or a battery cell group composed of a plurality of battery cells. In addition, the battery modules 10_1 to 10_n can have no battery monitor circuit, or each of the battery modules 10_1 to 10_n may individually contains a dedicated battery monitor circuit. If the battery modules 10_1 to 10_n each contain a dedicated battery monitor circuit, the battery monitor circuits can be operated independently of each other.

If the charger apparatus shown in FIG. 1 is assumed to use one single charger, then the charging current output terminal and the charging current input terminal of the charger are coupled separately to the positive terminal (the anode) of the first battery module 10_1 and the negative terminal (the cathode) of the last battery module 10_n. Therefore, the charging voltage of the single charger may be set to be greater than or equal to the sum of the rated voltages of the n-th battery modules 10_1 to 10_n. Apparently, the single charger supplying such high voltages may be costly.

The charger apparatus shown in FIG. 1 has a plurality of chargers. Specifically, the charger apparatus shown in FIG. 1 includes m chargers 100_1, ..., 100_a, ..., 100_b, ..., 100_c, ..., 100_d, ..., and 100_m. Here, a, b, c, d and m are integers, and a, b, c, and d are all smaller than m; these chargers 100_1 to 100_m can be divided into two or more charger groups. For example, in the embodiment, the chargers 100_1 to 100_m are grouped into the first charge group 110 and the second charger group 120. The chargers 100_1~100_a~100_b are grouped into the first charge group 110, while the chargers 100_c~100_d~100_m are grouped into the second charger group 120. The actual number of chargers in the first charger group 110 and the second charger group 120 should not be limited to that depicted in FIG. 1. For instance, if there are four chargers, the respective number of chargers in the first charger group 110 and the second charger group 120 may be one and three or two and two.

The charging current output terminals and the charging current input terminals of the chargers 100_1 to 100_m are coupled separately to the corresponding battery modules of the battery modules 10_1 to 10_n. For example, the charging current output terminal of the charger 100_a is coupled to the positive terminal (the anode) of the i-th battery module 10_i of the battery modules 10_1 to 10_n, the charging current input terminal of the charger 100_a is coupled to the first node N1 which is between the j-th battery module 10_j and the k-th battery module 10_k of the battery modules 10_1 to 10_n. The charging current output terminal of the charger 100_d is coupled to the second node N2 which is between the i-th battery module 10_i and the j-th battery module 10_j, and the charging current input terminal of the charger 100_d is coupled to the negative terminal (the cathode) of the k-th battery module 10_k.

The quantity m of the chargers 100_1 to 100_m is greater than or equal to the quantity n of the battery modules 10_1 to 10_n. The charging and discharging operations on the battery modules 10_1 to 10_n by the chargers 100_1 to 100_m are independent of each other. The chargers 100_1 to 100_m each apply a constant current (CC) method and/or a constant voltage (CV) method to charge and discharge the corresponding battery modules of the battery modules 10_1 to 10_n, while the way to implement the chargers 100_1 to 100_m is not limited in the embodiment. For example, any one of the chargers 100_1 to 100_m can be a power supply unit, a bipolar power supply unit, a DC-DC convertor, an AC-DC convertor, a voltage regulator, or any other charging/discharging circuit. In some embodiments, the internal circuit structure of the chargers 100_1 to 100_m can be the same. In other embodiments, some or all of the internal circuit structures of the chargers 100_1 to 100_m can be different.

The arrangement relationship (the charging relationship) between the chargers 100_1 to 100_m and the battery modules 10_1 to 10_n can be represented by a configuration matrix A. Therefore, the configuration matrix A is an m*n matrix, where m is the quantity of chargers 100_1 to 100_m, and n is the quantity of battery modules 10_1 to 10_n. Here, the x-th column of the configuration matrix A represents the battery modules charged and discharged by the x-th charger 100_x, and the y-th row of the configuration matrix A represents the chargers that charge and discharge the y-th battery module 10_y. If the configuration matrix A represents the charging relationship between the chargers 100_1 to 100_m and the battery modules 10_1 to 10_n, the configuration matrix A is a full rank matrix. For example, the configuration matrix A can be an identity matrix or any other full-rank matrix. The configuration matrix A satisfies the equation (1), where X is the instantaneous electric quantity vector of the chargers 100_1 to 100_m, and Y is the instantaneous voltage change amount vector of the battery modules 10_1 to 10_n. The examples of the matrix A and the vectors X and Y will be described in detail later.

$$AX=Y \quad (1)$$

FIG. 1 shows that the chargers 100_1 to 100_m of the charging apparatus can be connected to the battery modules 10_1 to 10_n dispersedly and interlacedly (i.e., in form of a matrix), and both the charging operation and battery equalization are simultaneously completed. Each charger manages its work without cooperating with the other chargers, and the charging apparatus depicted in FIG. 1 can be regulated intellectually due to its matrix structural design.

Figure 2:
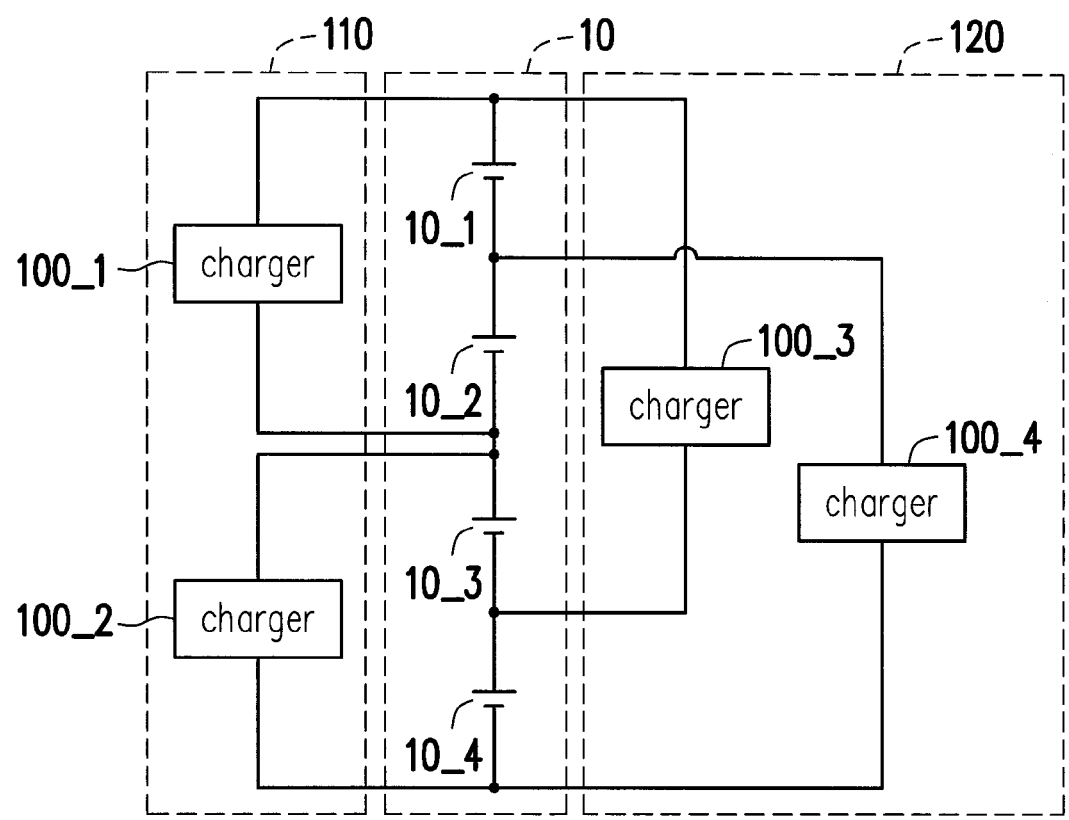
FIG. 2 is a schematic block diagram of a circuit of a charger apparatus according to another embodiment of disclosure.

A four-series-and-one-parallel (4S1P) battery combination matrix charging structure is taken for example. FIG. 2 is a schematic block diagram of a circuit of a charger apparatus according to another embodiment of disclosure. The embodiment shown in FIG. 2 and the embodiment shown in FIG. 1 can be cross-referenced. With reference to FIG. 2, in this embodiment, the charging apparatus includes four chargers 100_1, 100_2, 100_3, and 100_4 (i.e., m=4), and the battery module series 10 comprises four battery modules 10_1, 10_2, 10_3, and 10_4 (i.e., n=4) connected in series. The chargers 100_1 to 100_4 can be grouped into the first charger group 110 and the second charger group 120. Here, for example, the chargers 100_1 and 100_2 are grouped into the first group 110, and the chargers 100_3 and 100_4 are grouped into the second charger group 120.

FIG. 2 shows the arrangement relationship between the chargers 100_1 to 100_4 and the battery modules 10_1 to 10_4, and the charging voltage of the charger 100_1 can be set to be greater than or equal to the sum of the rated voltages of the two battery modules 10_1 and 10_2. The charging voltage of the charger 100_2 can be set to be greater than or equal to the sum of the rated voltages of the two battery modules 10_3 and 10_4. The charging voltage of the charger 100_3 can be set to be greater than or equal to the sum of three rated voltages of the battery modules 10_1, 10_2, and 10_3. The charging voltage of the charger 100_4 can be set to be greater than or equal to the sum of three rated voltages of the battery modules 10_2, 10_3, and 10_4. The chargers 100_1 to 100_4 independently charge and discharge the battery modules 10_1 to 10_4 from each other without having to cooperate with other chargers. For example, the battery charger 100_1 can measure the voltage of the battery series (measuring the voltages of the battery modules 10_1 and 10_2). When the voltage of the battery series (the battery modules 10_1 and 10_2) is too low, the charger 100_1 can charge the battery series (the battery modules 10_1 and 10_2); when the voltage of the battery series (the battery modules 10_1 and 10_2) is too high, the charger 100_1 can discharge the battery series (the battery modules 10_1 and 10_2). The charging and discharging operations of the remaining chargers 100_2 to 100_4 can be performed accordingly. Finally, the voltage of the each battery modules 10_1 to 10_4 can reach the target voltage and can be equalized.

FIG. 2 shows the configuration relationships (i.e., the charging relationship) between the chargers 100_1 to 100_4 and the battery modules 10_1 to 10_4, so that the configuration matrix A of the charging apparatus shown in FIG. 2 can be expressed as equation (2). The instantaneous electric quantity vector X of the chargers 100_1 to 100_4 can be expressed as equation (3), and the instantaneous voltage change vector Y of the battery modules 10_1 to 10_4 can be expressed as equation (4). Here, the matrix A and the vectors X and Y can be expressed as equation (5).

$$A = \begin{bmatrix} 1 & 0 & 1 & 0 \\ 1 & 0 & 1 & 1 \\ 0 & 1 & 1 & 1 \\ 0 & 1 & 0 & 1 \end{bmatrix} \quad (2)$$

$$X = \begin{bmatrix} \Delta(I_1 t_1) \\ \Delta(I_2 t_2) \\ \Delta(I_3 t_3) \\ \Delta(I_4 t_4) \end{bmatrix} \quad (3)$$

$$Y = \begin{bmatrix} C_1 \Delta V_1 \\ C_2 \Delta V_2 \\ C_3 \Delta V_3 \\ C_4 \Delta V_4 \end{bmatrix} \quad (4)$$

$$\begin{bmatrix} 1 & 0 & 1 & 0 \\ 1 & 0 & 1 & 1 \\ 0 & 1 & 1 & 1 \\ 0 & 1 & 0 & 1 \end{bmatrix} \begin{bmatrix} \Delta(I_1 t_1) \\ \Delta(I_2 t_2) \\ \Delta(I_3 t_3) \\ \Delta(I_4 t_4) \end{bmatrix} = \begin{bmatrix} C_1 \Delta V_1 \\ C_2 \Delta V_2 \\ C_3 \Delta V_3 \\ C_4 \Delta V_4 \end{bmatrix} \quad (5)$$

In equation (2), "1" shown in the configuration matrix A in the first column and the first row represents the charging relationship between the first charger 100_1 and the first battery module 10_1; namely, the charging current of the first charger 100_1 can be directly or indirectly supplied to the first battery module 10_1. In the first column and the fourth row of the configuration matrix A shown in the equation (2), "0" indicates that there is no charging relationship between the first charger 100_1 and the fourth battery module 10_4. The other elements of the configuration matrix A can be accordingly deduced from the above.

In the instantaneous electric quantity vector X of the chargers 100_1 to 100_4 shown in equation (3), $I_1$ represents the output value of the charging current of the first charger 100_1, and $I_1 t_1$ represents the output of the charging electric quantity of the first charger 100_1 during the time $t_1$. The other elements of the instantaneous electric quantity vector X can be deduced from the above accordingly.

In the instantaneous voltage change amount vector Y of the battery modules 10_1 to 10_4 shown in equation (4), $C_1$ represents a capacitance value of the first battery module 10_1, and $\Delta V_I$ represents the voltage change amount of the first battery module 10_1. The other elements of the instantaneous voltage change amount vector Y can be deduced from the above accordingly.

In FIG. 1, the charging current output terminal and the charging current input terminal of each of the chargers 100_1 to 100_m is coupled separately to the corresponding battery module of the battery modules 10_1 to 10_n. The connection pattern of each charger coupled to the corresponding battery module series 10 includes: coupled to one battery module (n kinds of connection patterns), coupled to two battery modules (n−1 kinds of connection patterns), . . . , and coupled to n battery modules (one kind of connection pattern). Here, m kinds of the connection patterns may be selected from all connection patterns of the battery modules 10_1 to 10_n by the chargers 100_1 to 100_m mentioned above, wherein each of the battery modules 10_1 to 10_n can be directly or indirectly charged and discharged by at least one of the chargers.

Figure 3:
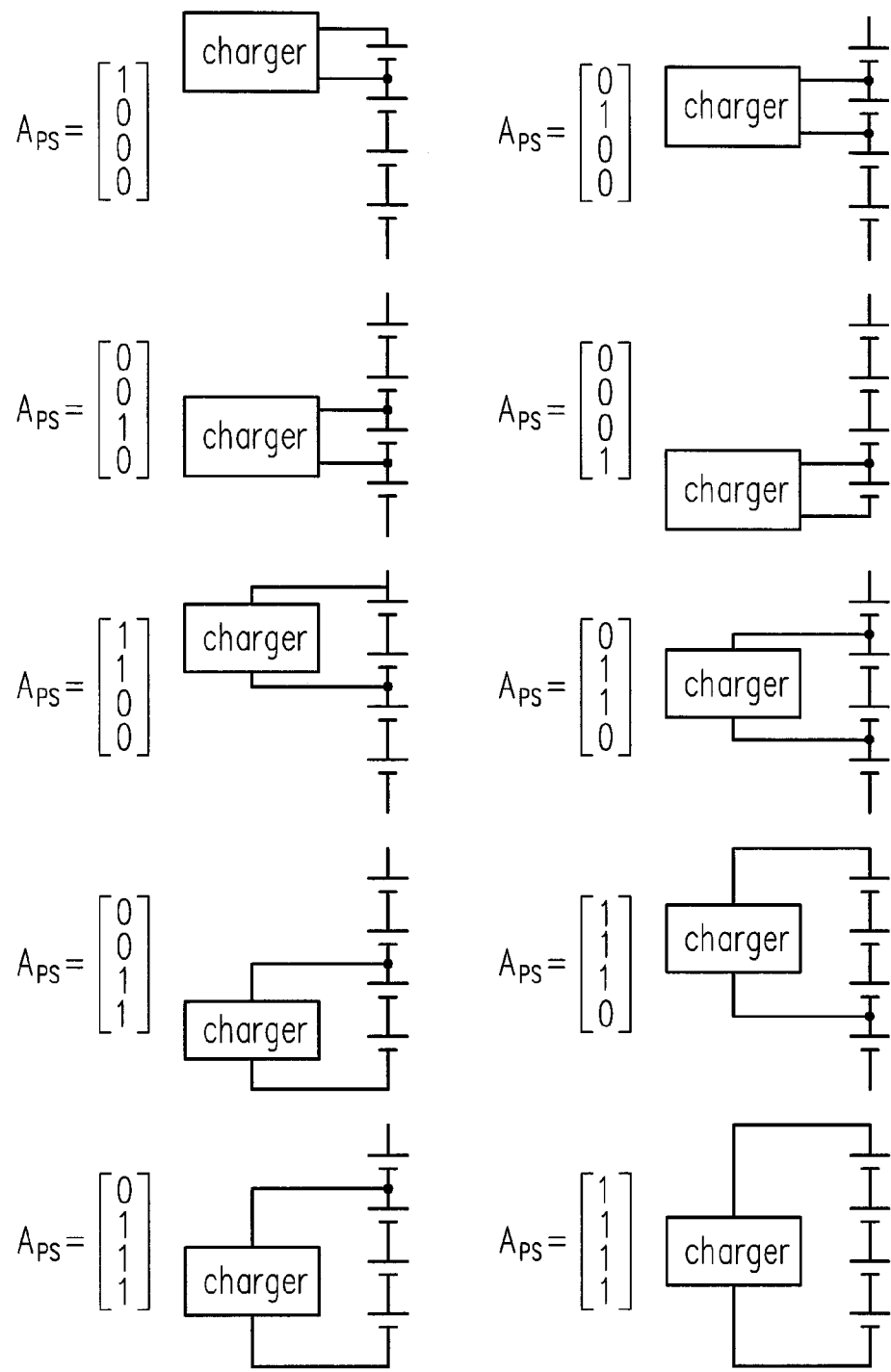
FIG. 3 is a schematic diagram illustrating all connection patterns that may be selected by a charger to connect a battery module series exemplarily having four battery modules.

The battery module series 10 with four battery modules 10_1 to 10_4 is taken for example. In the battery module series 10, one charger in total may select from ten kinds (4+3+2+1) of the connection patterns to connect the battery module series 10. FIG. 3 is a schematic diagram illustrating all connection patterns that may be selected by the charger to connect a battery module series exemplarily having four battery modules. The configuration matrix $A_{PS}$ showing the connection relationship between the charger and the four battery modules can be expressed as equation (6). The equation (6) shows ten kinds of the connection patterns representing the connection relationship between the charger and the batter module series, which may be referred to as that shown in FIG. 3. The embodiment shown in FIG. 1 may also be deduced from the descriptions with respect to FIG. 3.

$$A_{PS} = \begin{bmatrix}1\\0\\0\\0\end{bmatrix} \text{ or } \begin{bmatrix}0\\1\\0\\0\end{bmatrix} \text{ or } \begin{bmatrix}0\\0\\1\\0\end{bmatrix} \text{ or } \begin{bmatrix}0\\0\\0\\1\end{bmatrix} \text{ or } \begin{bmatrix}1\\1\\0\\0\end{bmatrix} \text{ or } \begin{bmatrix}0\\1\\1\\0\end{bmatrix} \text{ or } \begin{bmatrix}0\\0\\1\\1\end{bmatrix} \text{ or } \begin{bmatrix}1\\1\\1\\0\end{bmatrix} \text{ or } \begin{bmatrix}0\\1\\1\\1\end{bmatrix} \text{ or } \begin{bmatrix}1\\1\\1\\1\end{bmatrix} \quad (6)$$

Figure 4:
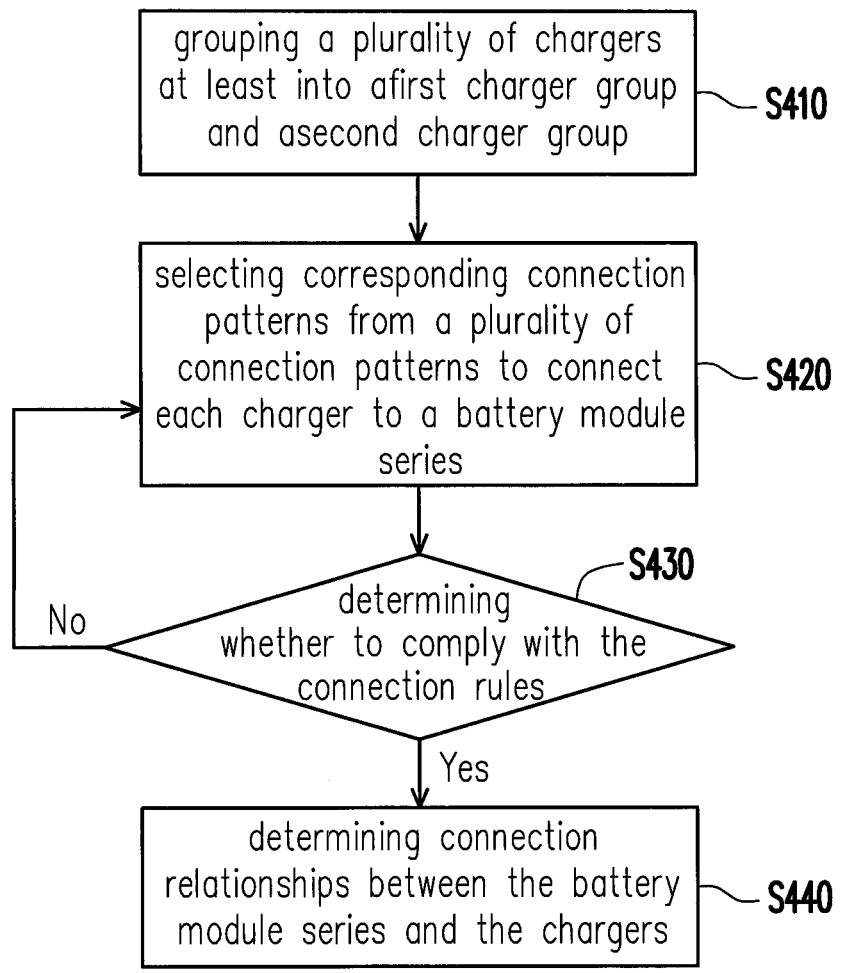
FIG. 4 is a schematic flow chart of a charging method according to an embodiment of the disclosure.

FIG. 4 is a schematic flow chart of a charging method according to an embodiment of the disclosure. In step S410, a plurality of the chargers of the charging apparatus can be at least grouped into the first charger group 110 and the second charger group 120. For example, m chargers 100_1 to 100_m can be grouped into the first charger group 110 and the second charger group 120. In step S420, each of the chargers 100_1 to 100_m respectively selects the corresponding connection pattern from a plurality of connection patterns to connect to the battery module series 10, wherein each battery module of the battery module series 10 can be charged and discharged by the chargers 100_1 to 100_m. For example, assuming that the charging apparatus has four chargers 100_1 to 100_4, and the chargers can select four different kinds of the connected patterns from ten kinds of the connected patterns shown in FIG. 3; that is, four kinds of different matrices may be selected from ten kinds of the configurations matrices $A_{PS}$ shown in equation (6). In this embodiment, the chargers 100_1 to 100_2 of the first charger group 110 select different corresponding connection patterns, and the chargers 100_3 to 100_4 of the second charger group 120 select different corresponding connection patterns. In other embodiments, the connection patterns selected for these chargers 100_1 to 100_4 are different. The relationship between the chargers 100_1 to 100_4 and the battery modules can be a "linearly independent" relationship (e.g., $$\begin{bmatrix}1\\0\\0\\0\end{bmatrix}, \begin{bmatrix}0\\1\\0\\0\end{bmatrix}, \begin{bmatrix}0\\0\\1\\0\end{bmatrix}, \text{ and } \begin{bmatrix}0\\0\\0\\1\end{bmatrix}$$

indicated in equation (6) are mutually linearly independent), a cross-lapped connection relationship (e.g., $$\begin{bmatrix}1\\1\\0\\0\end{bmatrix} \text{ and } \begin{bmatrix}0\\1\\1\\0\end{bmatrix}$$

indicated in equation (6) are interleaved), or a coverage relationship (e.g., $$\begin{bmatrix}1\\1\\0\\0\end{bmatrix}$$

cover $$\begin{bmatrix}1\\0\\0\\0\end{bmatrix}$$

in equation (6)).

In equation (6), four out of ten kinds of the configuration matrices $A_{PS}$ are selected to form the configuration matrix A, where the rank of the configuration matrix A is equal to the quantity n of the battery modules 10_1 to 10_n, and the voltage can converge for sure during the charging and discharging operation. When the chargers 100_1 to 100_m are mutually linearly independent; that is, the configuration matrix A is a full rank matrix, the charging apparatus can simultaneously perform the charging operation and achieve battery equalization. As exemplarily shown in FIG. 2, four out of ten kinds of different configuration matrices $A_{PS}$ shown in equation (6) are selected, and the selected four configuration matrices $A_{PS}$ are $$\begin{bmatrix}1\\1\\0\\0\end{bmatrix}, \begin{bmatrix}0\\0\\1\\1\end{bmatrix}, \begin{bmatrix}1\\1\\1\\0\end{bmatrix}, \text{ and } \begin{bmatrix}0\\1\\1\\1\end{bmatrix}.$$

Accordingly, the configuration matrix A composed of the four selected configuration matrices $A_{PS}$ is $$\begin{bmatrix}1 & 0 & 1 & 0\\1 & 0 & 1 & 1\\0 & 1 & 1 & 1\\0 & 1 & 0 & 1\end{bmatrix}.$$

The rank of the configuration matrix A is equal to the quantity of the battery modules 10_1 to 10_4 (i.e., four battery modules), and the configuration matrix A is a full rank matrix. Therefore, the charging apparatus shown in FIG. 2 can charge and equalize batteries simultaneously during the charging and discharging operation.

With reference to FIG. 4, in step S430, the connection pattern selected in step S420 may be examined to determine if it meets connection rules. One or more inspection methods may be conducted in step S430. For example, in some embodiments, whether the configuration matrix A is a full rank matrix or not may be determined in step S430; in another embodiment, the first charging combination of the first charger group 110 and the second charging combination of the second charger group 120 may be examined in step S430. Here, "the first charging combination" is obtained by each charger of the first charger group 110 respectively selecting the corresponding connection pattern from a plurality of connection patterns to connect to the battery module series 10; "the second charging combination" is obtained by each charger of the second charger group 120 respectively selecting the corresponding connection pattern from a plurality of connection patterns to connect to the battery module series 10. The first charging combination indicates each of the battery modules 10_1 to 10_$n$ is charged by some chargers of the first charger group 110, and the second charging combination indicates each of the battery modules 10_1 to 10_$n$ is charged by some chargers of the second charger group 120. For example, in the battery module series 10 exemplarily having four battery modules 10_1 to 10_4, the configuration matrices $A_{PS}$ $$\begin{bmatrix} 0 \\ 0 \\ 1 \\ 1 \end{bmatrix} \text{ and } \begin{bmatrix} 1 \\ 1 \\ 1 \\ 0 \end{bmatrix}$$

are selected from the equation (6) in step S420 as the corresponding connection pattern of the chargers 100_1 and 100_2 of the first charger group 110, and the configuration matrices $A_{PS}$ $$\begin{bmatrix} 1 \\ 1 \\ 1 \\ 1 \end{bmatrix} \text{ and } \begin{bmatrix} 0 \\ 0 \\ 1 \\ 0 \end{bmatrix}$$

are selected in step S420 as the corresponding connection pattern of the chargers 100_3 and 100_4 of the second charger group 120. As for the first charger group 110, its corresponding first charging combination $$\begin{bmatrix} 0 & 1 \\ 0 & 1 \\ 1 & 1 \\ 1 & 0 \end{bmatrix}$$

indicates that the battery module 10_1 is charged/discharged by one charger, the battery module 10_2 is charged/discharged by one charger, the battery module 10_3 is charged/discharged by two chargers, and the battery charger module 10_4 is charged/discharged by one charger. As for the second charger group 120, its corresponding second charging combination $$\begin{bmatrix} 1 & 0 \\ 1 & 0 \\ 1 & 1 \\ 1 & 0 \end{bmatrix}$$

indicates that the battery module 10_1 is charged/discharged by one charger, the battery module 10_2 is charged/discharged by one charger, the battery module 10_3 is charged/discharged by two chargers, and the battery charger module 10_4 is charged/discharged by one charger. Since the second charging combination is the same as the first charging combination, the connection patterns $$\begin{bmatrix} 0 \\ 0 \\ 1 \\ 1 \end{bmatrix} \text{ and } \begin{bmatrix} 1 \\ 1 \\ 1 \\ 0 \end{bmatrix}$$

of the first charger group 110 and the connection patterns $$\begin{bmatrix} 1 \\ 1 \\ 1 \\ 1 \end{bmatrix} \text{ and } \begin{bmatrix} 0 \\ 0 \\ 1 \\ 0 \end{bmatrix}$$

of the second charger group 120 selected in step S420 do not comply with the connection rules.

In another embodiment, whether the connection patterns selected by the chargers 100_1 to 100_$m$ in step S420 are repeated/are the same may be examined in step S430. For example, if the connection patterns selected by the chargers 100_1 and 100_2 in step S420 are both $$\begin{bmatrix} 0 \\ 0 \\ 1 \\ 1 \end{bmatrix},$$

in step S430, the selection is determined not to comply with the connection rules.

In step S420, when the connection patterns selected for the chargers 100_1 to 100_$m$ appear to be "linearly independent of each other", the connection state can converges the battery voltage. For instance, in the battery module series 10 exemplarily having 4 battery modules 10_1 to 10_4, $$\begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \text{ and } \begin{bmatrix} 0 \\ 0 \\ 0 \\ 1 \end{bmatrix}$$

are selected by the chargers 100_1 to 100_4 as the connection patterns.

When the connection patterns selected by the chargers 100_1 to 100_m appear to be mutually "covered" and "connected in a cross-lapped manner" in step S420, step S430 determine/check whether connection pattern of each of the chargers can be substituted with other connection patterns, and if yes, such condition should be avoided. For example, if $$\begin{bmatrix}1\\0\\0\\0\end{bmatrix}, \begin{bmatrix}0\\1\\0\\0\end{bmatrix}, \begin{bmatrix}1\\1\\0\\0\end{bmatrix}, \text{and} \begin{bmatrix}0\\1\\1\\0\end{bmatrix}$$

are selected in step S420, then $$\begin{bmatrix}1\\1\\0\\0\end{bmatrix} \text{and} \begin{bmatrix}0\\1\\1\\0\end{bmatrix}$$

are interleaved at the second row, $$\begin{bmatrix}1\\0\\0\\0\end{bmatrix} \text{and} \begin{bmatrix}0\\1\\0\\0\end{bmatrix}$$

are "covered" within $$\begin{bmatrix}1\\1\\0\\0\end{bmatrix},$$

and the effects achieved by $$\begin{bmatrix}1\\0\\0\\0\end{bmatrix} \text{and} \begin{bmatrix}0\\1\\0\\0\end{bmatrix}$$

that work collectively are equivalent to the effects achieved by $$\begin{bmatrix}1\\1\\0\\0\end{bmatrix}.$$

According to the determination result of the step S430, the connection patterns selected in step S420 do not comply with the connection rules.

If the determination result of the step S430 lies in that the connection patterns selected in step S420 do not comply with the connection rules, then the step S420 will once again be performed to select another combination of the connection patterns. If the determination result of the step S430 is that the connection patterns selected in the step S420 comply with the connection rules, then the connection relationships between the battery module series 10 and the chargers 100_1 to 100_m and the corresponding connection structures may be recognized/determined according to the connection patterns selected in the step S420 (step S440).

Figure 5:
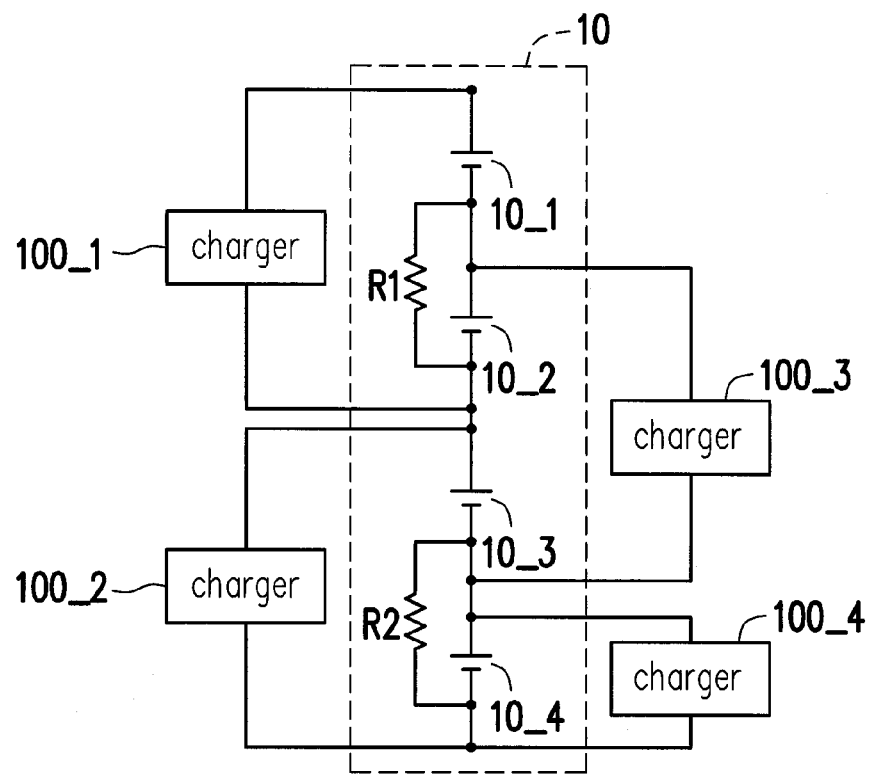
FIG. 5 is a schematic block diagram of a circuit of a charger apparatus according to yet another embodiment of the disclosure.

FIG. 5 is a schematic block diagram of a circuit of a charger apparatus according to yet another embodiment of the disclosure. The embodiments shown in FIG. 5, FIG. 1, and FIG. 2 may be cross-referenced to one another. As shown in FIG. 5, in the embodiment, the charging apparatus includes four chargers 100_1, 100_2, 100_3, and 100_4 (i.e., m=4), and the battery module series 10 includes four serially connected battery modules 10_1, 10_2, 10_3, and 10_4 (i.e., n=4). FIG. 5 shows the configuration relationships between the chargers 100_1 to 100_4 and the battery modules 10_1 to 10_4. The charging voltage of the charger 100_1 can be set to be greater than or equal to the sum of the rated voltages of the battery modules 10_1 and 10_2. The charging voltage of the charger 100_2 can be set to be greater than or equal to the sum of the rated voltages of the battery modules 10_3 and 10_4. The charging voltage of the charger 100_3 can be set to be greater than or equal to the sum of the rated voltages of the battery modules 10_2 and 10_3. The charging voltage of the charger 100_4 can be set to be greater than or equal to the sum of the rated voltage of the battery module 10_4. By determining the charging voltages respectively output by the chargers 100_1 to 100_4, the fully-charged voltages of different battery modules may be set, which is elaborated hereinafter.

FIG. 5 shows the configuration relationship (the charging relationship) between the chargers 100_1 to 100_4 and the battery modules 10_1 to 10_4, and the configuration matrix A of the charging apparatus shown in FIG. 5 can be expressed as equation (7) as below.

$$A = \begin{bmatrix}1 & 0 & 0 & 0\\1 & 0 & 1 & 0\\0 & 1 & 1 & 0\\0 & 1 & 0 & 1\end{bmatrix} \quad (7)$$

The equation (7) shows that the rank of the configuration matrix A equals the quantity of the battery modules 10_1 to 10_4; that is, the configuration matrix A is a full rank matrix, so the voltage can converge during the charging/discharging operation of the charging apparatus shown in FIG. 5. Therefore, the charging apparatus shown in FIG. 5 can simultaneously complete the charging operation and achieve battery equalization.

In order to verify the charging apparatus shown in FIG. 5, additional resistors R1 and R2 are applied to simulate self-discharge of the battery modules 10_2 and 10_4. Here, the electricity of the battery modules 10_2 and 10_4 is assumed to be 2 Ah. If the battery module 10_4 self-discharges 2 Ah to half of the electricity in seven days, the self-discharge current is (2 Ah*0.5)/(24 h*7)=5.95 mA. If the rated voltage of the battery modules 10_2 and 10_4 is assumed to be 3.7V, then the self-discharge resistance of the resistor R2 for simulation is 3.7V/(5.95 mA)=620Ω. If the battery module 10_2 self-discharges 2 Ah to one fourth the power in seven days, the resistance of the resistor R2 is 1240Ω.

Figure 6:
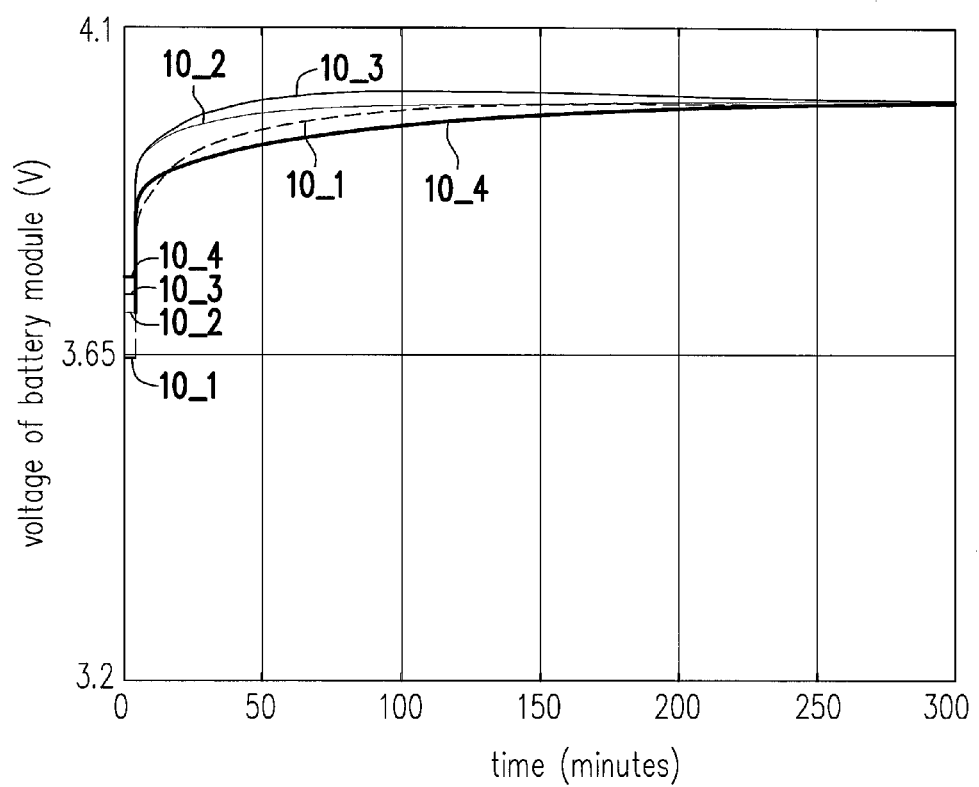
FIG. 6 is a schematic diagram illustrating experiment results of the charger apparatus shown in FIG. 5 according to an embodiment of the disclosure.

FIG. 6 is a schematic diagram illustrating experiment results of the charger apparatus shown in FIG. 5 according to an embodiment of the disclosure. In FIG. 6, the horizontal axis represents time (in units of minutes), and the ordinate axis indicates the voltage of the battery module (in units of volts). The charging voltage and the charging current of the chargers 100_1 to 100_3 are respectively set as 8V and 1 A, while the charging voltage and the charging current of the charger 100_4 are 4V and 1 A. From FIG. 6, it can be learned that the voltages of the battery modules 10_1 to 10_4 can converge and can be equalized after the charging and discharging operations of the chargers 100_1 to 100_4, although the threshold voltages of the battery modules 10_1 to 10_4 shown in FIG. 5 are different from each other before charging, and the battery modules 10_2 and 10_4 may perform the self-discharging operation. Therefore, the charging apparatus shown in FIG. 5 can simultaneously complete the charging operation and achieve battery equalization.

In another embodiment, the circuit structure of the charging apparatus shown in FIG. 5 remains unchanged, but the charging voltage and the charging current of the charger 100_1 is set as 7.7V and 1 A, the charging voltage and the charging current of the charger 100_2 is 8.1 V and 1 A, the charging voltage and the charging current of the charger 100_3 is 7.9V and 1 A, and the charging voltage and the charging current of the charger 100_4 is 4.1V and 1 A. Before charging, the threshold voltages of the battery modules 10_1 to 10_4 shown in FIG. 5 are different from each other, and the battery modules 10_2 and 10_4 may perform the self-discharging operation. However, after the charging and discharging operations of the chargers 100_1 to 100_4, the voltage of the battery module 10_1 can converge to 3.8V, the voltage of the battery module 10_2 can converge to 3.9V, the voltage of the battery module 10_3 can converge to 4.0V, and the voltage of the battery module 10_4 can converge to 4.1 V. Therefore, the charging apparatus shown in FIG. 5 can complete the charging operation; at the same time, different battery modules may be set to have different fully-charged voltages.

As described above, FIG. 1, FIG. 2, and FIG. 5 show the charging apparatus that is coupled to the corresponding battery module of the battery module series 10 in a dispersed and interleaved manner (e.g., like a matrix), so the charging apparatus can easily and efficiently perform the charging and discharging operation on the battery module series 10. In the scenario of different voltages and different currents of the charging station, the charging apparatus shown in FIG. 1, FIG. 2, and FIG. 5 is not required to be re-designed nor is required to be serially connected to a converter. According to the charging apparatus and the charging method described herein, the serially connected battery modules may be charged and discharged by the chargers, and battery equalization may be simultaneously achieved. Thus, the charging apparatus and the charging method do not require additional monitor/equalization circuit according to the embodiment.

In particular, the quantity m of the chargers 100_1 to 100_m can be greater than or equal to the quantity n of the battery modules 10_1 to 10_n. Under the condition that the quantity m of the chargers is greater than the quantity n of the battery modules, the charging apparatus shown in FIG. 1 can be fault tolerant. For example, n battery modules can be connected to the (n+1) chargers, wherein n chargers selected from the (n+1) chargers can charge and discharge n battery modules, and the remaining charger may serve as a spare charger (not performing the charging and discharging operation).

Figure 7:
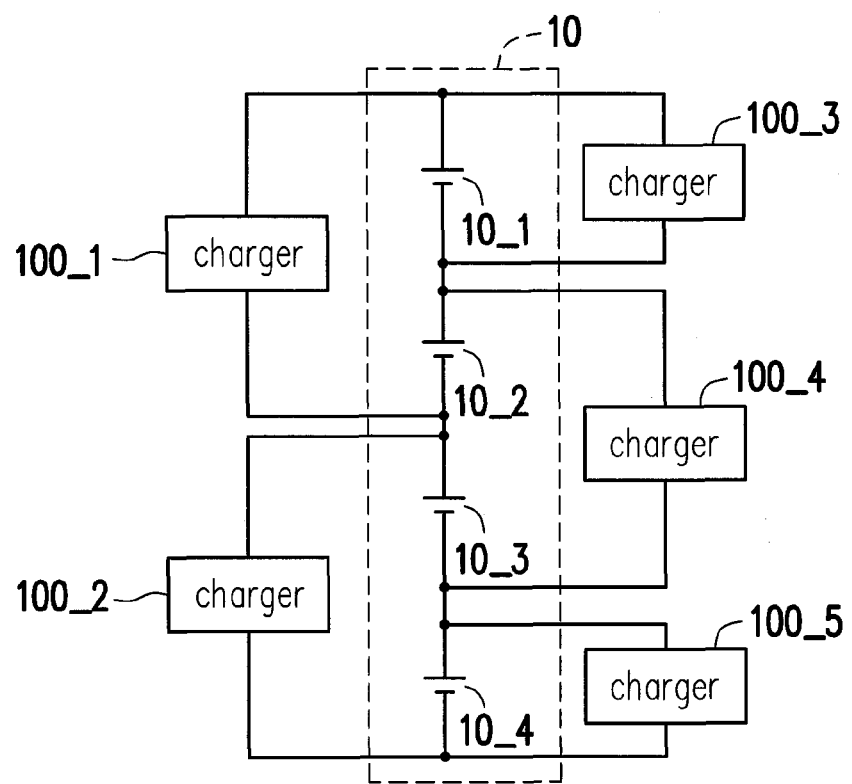
FIG. 7 is a schematic block diagram of a circuit of a charger apparatus according to yet another embodiment of the disclosure.

For example, FIG. 7 is a schematic block diagram of a circuit of a charger apparatus according to yet another embodiment of the disclosure, and the embodiment shown in FIG. 7 and the embodiments shown in FIG. 1, FIG. 2, and FIG. 5 can be cross-referenced to one another. As shown in FIG. 7, in this embodiment, the charging apparatus includes five chargers 100_1, 100_2, 100_3, 100_4, and 100_5 (i.e., m=5), and the battery module series 10 includes four serially connected battery modules 10_1, 10_2, 10_3, and 10_4 (i.e., n=4). FIG. 7 shows the configuration relationships (the charging relationships) between the chargers 100_1 to 100_5 and the battery modules 10_1 to 10_4, and the configuration matrix A' of the charging apparatus shown in FIG. 7 can be expressed as equation (8) as below.

$$A' = \begin{bmatrix} 1 & 0 & 1 & 0 & 0 \\ 1 & 0 & 0 & 1 & 0 \\ 0 & 1 & 0 & 1 & 0 \\ 0 & 1 & 0 & 0 & 1 \end{bmatrix} \quad (8)$$

In the embodiment, four out of five chargers 100_1 to 100_5 are selected to charge and discharge four battery modules 10_1 to 10_4, and the remaining charger serves as a spare charger (not performing the charging and discharging operation). For example, the chargers 100_1, 100_2, 100_4, and 100_5 are selected to charge and discharge the battery modules 10_1 to 10_4, and the charger 100_3 is disabled. In this case, the configuration matrix A of the charging apparatus shown in FIG. 7 can be expressed as equation (7) below. According to equation (1), equation (3), equation (4), and equation (7), the voltage change amount of the battery module 10_1 is $$\Delta V_1 = \frac{\Delta(I_1 t_1)}{C_1},$$

the voltage change amount of the battery module 10_2 is $$\Delta V_2 = \frac{\Delta(I_1 t_1) + \Delta(I_4 t_4)}{C_2},$$

the voltage change amount of the battery module 10_3 is $$\Delta V_3 = \frac{\Delta(I_2 t_2) + \Delta(I_4 t_4)}{C_3},$$

and the voltage change amount of the battery module 10_4 is $$\Delta V_4 = \frac{\Delta(I_2 t_2) + \Delta(I_5 t_5)}{C_4}.$$

The rank of the configuration matrix A equals the number of the battery modules 10_1 to 10_4 shown in equation (7), which indicates that the configuration matrix A is a full rank matrix. Hence, when the charger 100_3 shown in FIG. 7 is malfunctioned or disabled, the voltages of the remaining chargers 100_1, 100_2, 100_4, and 100_5, can converge during the charging and discharging operations. Therefore, the charging operations and battery equalization of the remaining chargers 100_1, 100_2, 100_4, and 100_5 shown in FIG. 7 can be completed simultaneously.

In another example, the chargers 100_2, 100_3, 100_4, and 100_5 are selected to charge and discharge the battery modules 10_1 to 10_4, and the charger 100_1 is disabled. Here, the configuration matrix A of the charging apparatus shown in FIG. 7 can be expressed as equation (9) below. According to equation (1), equation (3), equation (4), and equation (9), the voltage change amount of the battery module 10_1 is $$\Delta V_1 = \frac{\Delta(I_3 t_3)}{C_1},$$

the voltage change amount of the battery module 10_2 is $$\Delta V_2 = \frac{\Delta(I_4 t_4)}{C_2},$$

the voltage change amount of the battery module 10_3 is $$\Delta V_3 = \frac{\Delta(I_2 t_2) + \Delta(I_4 t_4)}{C_3},$$

and the voltage change amount of the battery module 10_4 is $$\Delta V_4 = \frac{\Delta(I_2 t_2) + \Delta(I_5 t_5)}{C_4}.$$

The equation (9) shows that the rank of the configuration matrix A equals the number of the battery modules 10_1 to 10_4, which indicates that the configuration matrix A is a full rank matrix. Hence, when the charger 100_1 shown in FIG. 7 is malfunctioned or disabled, the voltages of the remaining battery chargers 100_2 to 100_5 can converge during the charging and discharging operations, and the charging operations and the battery equalization of the remaining chargers 100_2 to 100_5 shown in FIG. 7 can be simultaneously completed.

$$A = \begin{bmatrix} 0 & 1 & 0 & 0 \\ 0 & 0 & 1 & 0 \\ 1 & 0 & 1 & 0 \\ 1 & 0 & 0 & 1 \end{bmatrix} \quad (9)$$

Therefore, the charging apparatus shown in FIG. 7 and characterized by fault tolerance can simultaneously perform the charging operation and achieve battery equalization. The charging apparatus depicted in FIG. 7 is coupled to the corresponding battery modules of the battery module series 10 in a dispersed and interlaced manner (e.g., a matrix); accordingly, the charging apparatus can easily and efficiently charge and discharge the battery module series 10, and thus the charging apparatus shown in FIG. 7 and the charging method described herein do not require any additional monitor/equalization circuit.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A charger apparatus for charging and discharging a battery module series, the battery module series comprising a plurality of battery modules mutually connected in series, the charger apparatus comprising a plurality of chargers, the chargers being at least grouped into a first charger group and a second charger group, and the chargers comprising:
   a first charger grouped into the first charger group, wherein a charging current output terminal of the first charger is coupled to a positive terminal of a i-th battery module of the battery modules, and a charging current input terminal of the first charger is coupled to a first node which is between a j-th battery module and a k-th battery module of the battery modules, wherein i, j, and k are integers, and j is between i and k; and
   a second charger grouped into the second charger group, wherein a charging current output terminal of the second charger is coupled to a second node which is between the i-th battery module and the j-th battery module of the battery modules, and a charging current input terminal of the second charger is coupled to a negative terminal of the k-th battery module.

2. The charger apparatus as claimed in claim 1, wherein the quantity of the chargers is greater than or equal to the quantity of the battery modules of the battery module series.

3. The charger apparatus as claimed in claim 1, wherein if a configuration matrix A represents a charging relationship between the chargers and the battery modules, the configuration matrix A is not an identity matrix.

4. The charger apparatus as claimed in claim 1, wherein if a configuration matrix A represents a charging relationship between the chargers and the battery modules, the configuration matrix A is a full rank matrix.

5. The charger apparatus as claimed in claim 1, wherein if a configuration matrix A represents a charging relationship between the chargers and the battery modules, the configuration matrix A satisfies an equation AX=Y, wherein X is an instantaneous electric quantity vector of the chargers, and Y is an instantaneous voltage change amount vector of the battery modules.

6. The charger apparatus as claimed in claim 5, wherein the configuration matrix A is an m*n matrix, m is the quantity of the chargers, and n is the quantity of the battery modules.

7. The charger apparatus as claimed in claim 1, wherein charging and discharging operations conducted by the chargers are independent of each other.

8. The charger apparatus as claimed in claim 1, wherein each of the chargers charges and discharges the corresponding battery module of the battery modules with constant current or constant voltage.

9. The charger apparatus as claimed in claim 1, wherein fully-charged voltages of the different battery modules are set by determining respective charging voltages of the chargers.

10. The charger apparatus as claimed in claim 1, wherein each of the chargers respectively selects a corresponding connection pattern from a plurality of connection patterns to connect to the battery module series, and each of the battery modules is charged and discharged by at least one of the chargers.

11. The charger apparatus as claimed in claim 10, wherein the chargers of the first charger group select the corresponding connection patterns different from each other, and the chargers of the second charger group select the corresponding connection patterns different from each other.

12. The charger apparatus as claimed in claim 10, wherein a first charging combination of the first charger group is different from a second charging combination of the second charger group, wherein the first charging combination is formed by each of the chargers of the first charger group respectively selecting the corresponding connection pattern from the connection patterns to connect to the batter module series, and the second charging combination is formed by each of the chargers of the second charger group respectively selecting the corresponding connection pattern from the connection patterns to connect to the batter module series.

13. A charging method comprising:
grouping a plurality of chargers at least into a first charger group and a second charger group, wherein the first charger group at least comprises a first charger, and the second charger group at least comprises a second charger; and
coupling the first charger group and the second charger group to a battery module series to charge and discharge the battery module series,
wherein the battery module series comprises a plurality of battery modules mutually connected in series,
wherein a charging current output terminal of the first charger is coupled to a positive terminal of a i-th battery module of the battery modules, and a charging current input terminal of the first charger is coupled to a first node which is between a j-th battery module and a k-th battery module of the battery modules, wherein i, j, and k are integers, and j is between i and k,
wherein a charging current input terminal of the second charger is coupled to a second node which is between the i-th battery module and the j-th battery module of the battery modules, and a charging current input terminal of the second charger is coupled to a negative terminal of the k-th battery module.

14. The charging method as claimed in claim 13, further comprising:
setting the quantity of the chargers to be greater than or equal to the quantity of the battery modules of the battery module series.

15. The charging method as claimed in claim 13, further comprising:
representing the charging relationship between the chargers and the battery modules by a configuration matrix A, wherein the configuration matrix A is not an identity matrix.

16. The charging method as claimed in claim 13, further comprising:
representing a charging relationship between the chargers and the battery modules by a configuration matrix A; and
making the configuration matrix A a full rank matrix.

17. The charging method as claimed in claim 13, further comprising:
representing a charging relationship between the chargers and the battery modules by a configuration matrix A; and
making the configuration matrix A satisfy an equation AX=Y, wherein X is an instantaneous electric quantity vector of the chargers, while Y is an instantaneous voltage change amount vector of the battery modules.

18. The charging method as claimed in claim 17, wherein the configuration matrix A is an m*n matrix, wherein m is the quantity of the chargers, while n is the quantity of the battery modules.

19. The charging method as claimed in claim 13, wherein the charging and discharging operations of the chargers are independent of each other.

20. The charging method as claimed in claim 13, wherein each of the chargers charges and discharges the corresponding battery module of the battery modules with constant current or constant voltage.

21. The charging method as claimed in claim 13, further comprising:
respectively setting fully-charged voltages of the different battery modules by determining respective charging voltages of the chargers.

22. The charging method as claimed in claim 13, wherein the step of coupling the first charger group and the second charger group to the battery module series comprising:
respectively selecting a corresponding connection pattern from a plurality of connection patterns for each of the chargers to connect to the battery module series, wherein each of the battery modules is charged and discharged by at least one of the chargers.

23. The charging method as claimed in claim 22, wherein the chargers of the first charger group select the corresponding connection patterns different from each other, and the chargers of the second charger group select the corresponding connection patterns different from each other.

24. The charging method as claimed in claim 22, wherein a first charging combination of the first charger group is different from a second charging combination of the second charger group, wherein the first charging combination is formed by each of the chargers of the first charger group respectively selecting the corresponding connection pattern from the connection patterns to connect to the batter module series, and the second charging combination is formed by each of the chargers of the second charger group respectively selecting the corresponding connection pattern from the connection patterns to connect to the batter module series.

* * * * *